US010824615B2

(12) United States Patent
Proctor et al.

(10) Patent No.: US 10,824,615 B2
(45) Date of Patent: Nov. 3, 2020

(54) METHODS AND SYSTEMS FOR UPDATING INFORMATION IN A TIMELINE OF A PUBLIC SAFETY INCIDENT

(71) Applicant: MOTOROLA SOLUTIONS, INC., Chicago, IL (US)

(72) Inventors: Lee M. Proctor, Cary, IL (US); Randy L. Ekl, Lake Zurich, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 471 days.

(21) Appl. No.: 15/642,070

(22) Filed: Jul. 5, 2017

(65) Prior Publication Data
US 2019/0012341 A1    Jan. 10, 2019

(51) Int. Cl.
*G06F 16/00*      (2019.01)
*G06F 16/23*      (2019.01)
*G06F 17/30*      (2006.01)
*G06F 16/2458*    (2019.01)
*G06Q 10/00*      (2012.01)
*G06Q 50/26*      (2012.01)

(52) U.S. Cl.
CPC ........ *G06F 16/235* (2019.01); *G06F 16/2358* (2019.01); *G06F 16/2477* (2019.01); *G06F 17/30365* (2013.01); *G06F 17/30368* (2013.01); *G06Q 10/00* (2013.01); *G06Q 50/265* (2013.01)

(58) Field of Classification Search
CPC ............... G06F 16/235; G06F 16/2358; G06F 16/2477; G06F 17/30365; G06F 17/30368
See application file for complete search history.

(56) References Cited

U.S. PATENT DOCUMENTS

| 6,944,137 B1* | 9/2005 | Pan ........................ H04W 76/45 370/266 |
| 9,336,675 B2 | 5/2016 | Miller et al. |
| 2003/0023476 A1 | 2/2003 | Gainey |
| 2009/0207852 A1* | 8/2009 | Greene ................. H04W 28/14 370/465 |

(Continued)

OTHER PUBLICATIONS

Examination Report from the Intellectual Property Office of Great Britain for Application No. GB1810113.9 dated Dec. 17, 2018 (6 pages).

(Continued)

*Primary Examiner* — Dinku W Gebresenbet
(74) *Attorney, Agent, or Firm* — Michael Best & Friedrich LLP

(57) ABSTRACT

One example method includes receiving, at an electronic computing device, a user query and identifying a time window in the past associated with the user query. The method further includes determining that the user query relates to a public safety incident. The method further includes generating a response to the user query. The response is generated as a function of the time window and information relating to the public safety incident. The method further includes storing the response such that information included in the response is added to one of (i) timeline information associated with a user of a communication device at a time commensurate with the time window and (ii) timeline information associated with the public safety incident at a time commensurate with the time window.

20 Claims, 6 Drawing Sheets

(56) References Cited

U.S. PATENT DOCUMENTS

| | | | |
|---|---|---|---|
| 2013/0141460 A1* | 6/2013 | Kane-Esrig | H04M 3/5116 |
| | | | 345/633 |
| 2014/0012574 A1 | 1/2014 | Pasupalak et al. | |
| 2015/0032366 A1* | 1/2015 | Man | G08G 1/096741 |
| | | | 701/412 |
| 2015/0310730 A1* | 10/2015 | Miller | H04W 4/90 |
| | | | 340/539.13 |
| 2016/0036974 A1* | 2/2016 | Strom | H04W 4/90 |
| | | | 455/404.1 |
| 2016/0105773 A1 | 4/2016 | Wawrowski et al. | |
| 2016/0216881 A1* | 7/2016 | Billgren | G06F 3/0488 |

OTHER PUBLICATIONS

Australian Examination Report dated May 8, 2019 for corresponding Australian Application No. 2018204371.
Australian Examination Report dated Apr. 22, 2020 for corresponding Australian Application No. 2018204371.
Australian Examination Report dated Feb. 26, 2020 for corresponding Australian Application No. 2018204371.

* cited by examiner

| TIME | EVENT | ADDITIONAL INFORMATION |
|------|-------|------------------------|
| 2:00 | PARKED VEHICLE AT CORNER OF FIRST STREET AND MAIN STREET | LOCATION OF TRAFFIC ACCIDENT |
| 2:15 | CALLED OFFICER JOE | |
| 2:20 | ENDED CALL WITH OFFICER JOE | |
| 2:30 | RECEIVED MASSAGE FROM DISPATCH CONSOLE | |
| 2:35 | DROVE VEHICLE AWAY FROM LOCATION OF TRAFFIC ACCIDENT | |

FIG. 3

| TIME | EVENT | ADDITIONAL INFORMATION |
|------|-------|------------------------|
| 1:30 | TRAFFIC LIGHTS AT FIRST STREET REPORTED AS MALFUNCTIONING | |
| 1:45 | STARTED RAINING AT CORNER OF FIRST STREET AND MAIN STREET | TRAFFIC HEAVILY CONGESTED ON FIRST STREET; AVERAGE VEHICLE SPEED OF 5 MPH |
| 2:00 | PARKED VEHICLE AT CORNER OF FIRST STREET AND MAIN STREET | LOCATION OF TRAFFIC ACCIDENT; CONSTRUCTION AREA |
| 2:15 | CALLED OFFICER JOE | |
| 2:20 | ENDED CALL WITH OFFICER JOE | |
| 2:30 | RECEIVED MESSAGE FROM DISPATCH CONSOLE | |
| 2:35 | DROVE VEHICLE AWAY FROM LOCATION OF TRAFFIC ACCIDENT | |

FIG. 5

METHODS AND SYSTEMS FOR UPDATING INFORMATION IN A TIMELINE OF A PUBLIC SAFETY INCIDENT

BACKGROUND OF THE INVENTION

Tablets, laptops, phones (for example, cellular or satellite), mobile (vehicular) or portable (personal) two-way radios, and other communication devices are now in common use by users, such as first responders (including firemen, police officers, and paramedics, among others), and provide such users and others with instant access to increasingly valuable additional information and resources such as vehicle histories, arrest records, outstanding warrants, health information, real-time traffic or other situational status information, and any other information that may aid the user in making a more informed determination of an action to take or how to resolve a situation, among other possibilities.

Many such communication devices further comprise, or provide access to, electronic digital assistants (or sometimes referenced as "virtual partners") that may provide the user thereof with valuable information in an automated (for example, without further user input) or semi-automated (for example, with some further user input) fashion. The valuable information provided to the user may be based on explicit requests for such information posed by the user via an input (for example, such as a parsed natural language input or an electronic touch interface manipulation associated with an explicit request) in which the electronic digital assistant may reactively provide such requested valuable information, or may be based on some other set of one or more context or triggers in which the electronic digital assistant may proactively provide such valuable information to the user absent any explicit request from the user.

As some existing examples, electronic digital assistants such as Siri provided by Apple, Inc.® and Google Now provided by Google, Inc.®, are software applications running on underlying electronic hardware that are capable of understanding natural language, and may complete electronic tasks in response to user voice inputs, among other additional or alternative types of inputs. These electronic digital assistants may perform such tasks as taking and storing voice dictation for future reference and retrieval, reading a received text message or an e-mail message aloud, generating a text message or e-mail message reply, looking up requested phone numbers and initiating a phone call to a requested contact, generating calendar appointments and providing appointment reminders, warning users of nearby dangers such as traffic accidents or environmental hazards, and providing many other types of information in a reactive or proactive manner.

BRIEF DESCRIPTION OF THE SEVERAL VIEWS OF THE DRAWINGS

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

FIG. 3 illustrates a timeline displayed on a screen of a communication device in accordance with some embodiments.

FIG. 5 illustrates an updated timeline displayed on a screen of a communication device in accordance with some embodiments.

Figure 1A:
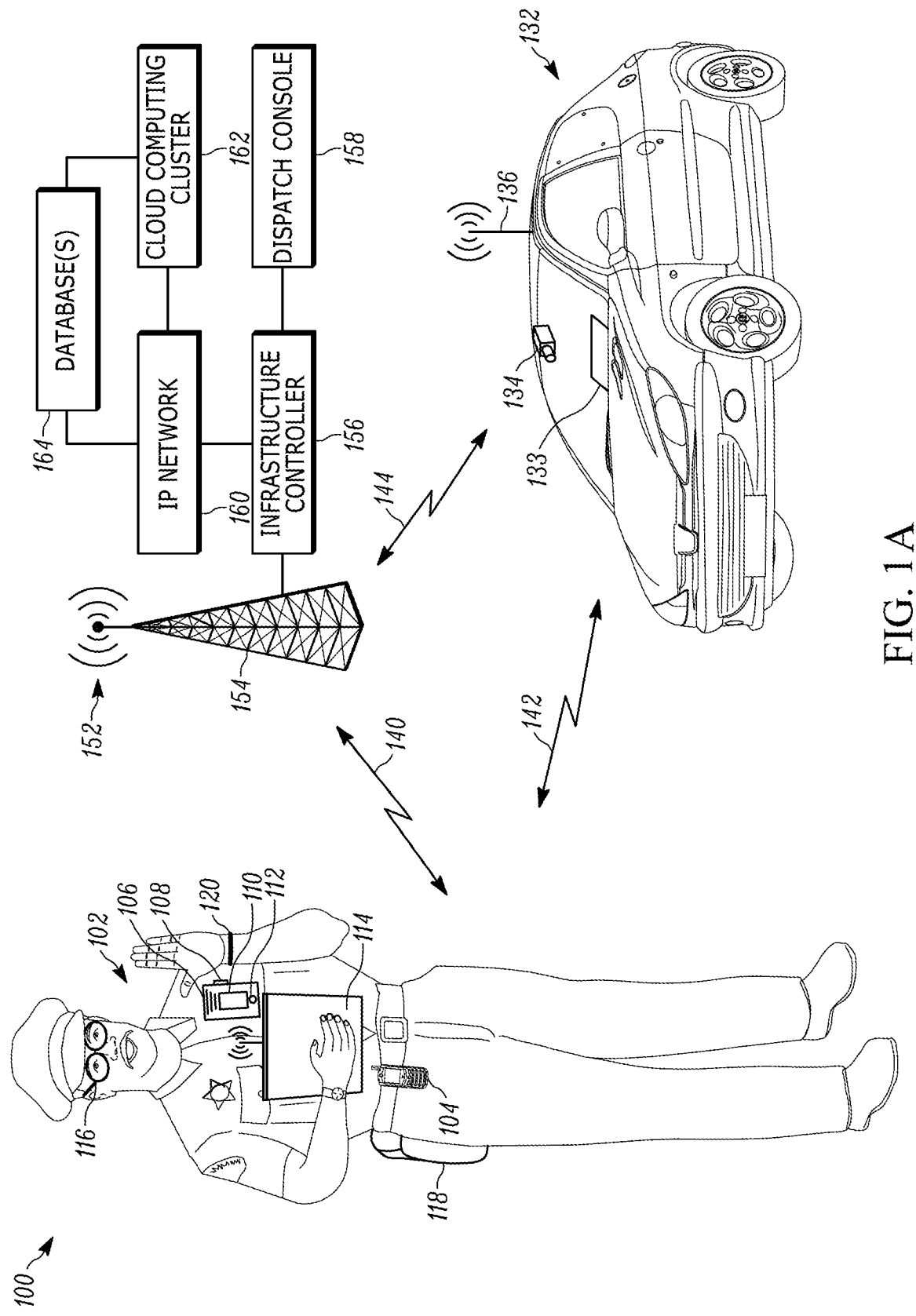
FIGS. 1A and 1B are system diagrams illustrating a system for operating an electronic digital assistant, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Applications are often installed on a communication device to provide additional functionality to a user. For example, applications often store information and provide an output to a user that displays the stored information. An example of such an application is a timeline application that stores timeline information associated with a public safety officer or a public safety event (that is, an event, occurrence, or situation affecting or potentially affecting the safety of one or more citizens that the public safety officer is tasked with protecting). With respect to a public safety officer, the timeline application may store actions of the public safety officer (for example, incoming and outgoing calls and messages and the like) and details of the environment of the public safety officer (for example, weather conditions, traffic conditions, and the like). Public safety officers often use communication devices at public safety incidents that they engage in to protect the public and keep the public safe (for example, a building fire, a criminal pursuit or other law enforcement event, a natural disaster, a medical incident, a traffic accident, and the like). With respect to a public safety incident, the timeline application may store events (for example, the arrival of back-up, communication to and from public safety officers handling the incident, and the like) that occur during the public safety incident and details of the environment (for example, weather conditions, traffic conditions, and the like) of the public safety incident. The timeline application may store such information by monitoring for and gathering the information in real-time. For example, the communication device may monitor transmitted and received communications and maintain stored information related to the communications (for example, in a call log, a message log, or the like). The timeline application may also allow a user to manually enter information in the timeline in real-time or after an event has occurred. For example, the timeline application may allow a public safety officer to enter the weather conditions at a given time and at a given public safety incident during the public safety incident or after the public safety officer returns to a public safety command center.

However, manually storing information for use with the timeline application as described above may be inconvenient and time-consuming. Additionally, using the communication device to monitor for and gather real-time information to be stored for use with the timeline application may not be possible in some situations and for all types of information. For example, the communication device may not be capable of determining the weather conditions or the traffic conditions at a public safety incident. Even when the communication device is capable of determining such conditions, these conditions may not always be relevant at a given public safety incident. When the timeline application stores such irrelevant information, a public safety officer using the timeline application to view the information may be less likely to recognize more relevant information.

Disclosed are a method, device, and system for an electronic digital assistant to update information in a timeline of a public safety incident. The electronic digital assistant may update timeline information stored for use with the timeline application described above based on a user query related to the public safety incident.

One embodiment provides a method for updating information in a timeline of a public safety incident. The method includes receiving, at an electronic computing device, a user query and identifying, by the electronic computing device, a time window in the past associated with the user query. The method further includes determining, by the electronic computing device, that the user query relates to a public safety incident. The method further includes generating, by the electronic computing device, a response to the user query. The response is generated as a function of the time window and information relating to the public safety incident. The method further includes storing, by the electronic computing device, the response such that information included in the response is added to one of (i) timeline information associated with a user of a communication device at a time commensurate with the time window and (ii) timeline information associated with the public safety incident at a time commensurate with the time window.

Another embodiment provides an electronic computing device that includes one or more electronic processors. The one or more electronic processors are configured to receive a user query, identify a time window in the past associated with the user query, and determine that the user query relates to a public safety incident. The one or more electronic processors are further configured to generate a response to the user query. The response is generated as a function of the time window and information relating to the public safety incident. The one or more electronic processors are further configured to store the response such that information included in the response is added to one of (i) timeline information associated with a user of a communication device at a time commensurate with the time window and (ii) timeline information associated with the public safety incident at a time commensurate with the time window.

Each of the above-mentioned embodiments will be discussed in more detail below, starting with example communication system and device architectures of the system in which the embodiments may be practiced, followed by an illustration of processing steps for achieving the method, device, and system for an electronic digital assistant. Further advantages and features consistent with this disclosure will be set forth in the following detailed description, with reference to the figures.

1. Communication System and Device Structures a. Communication System Structure

Figure 1B:
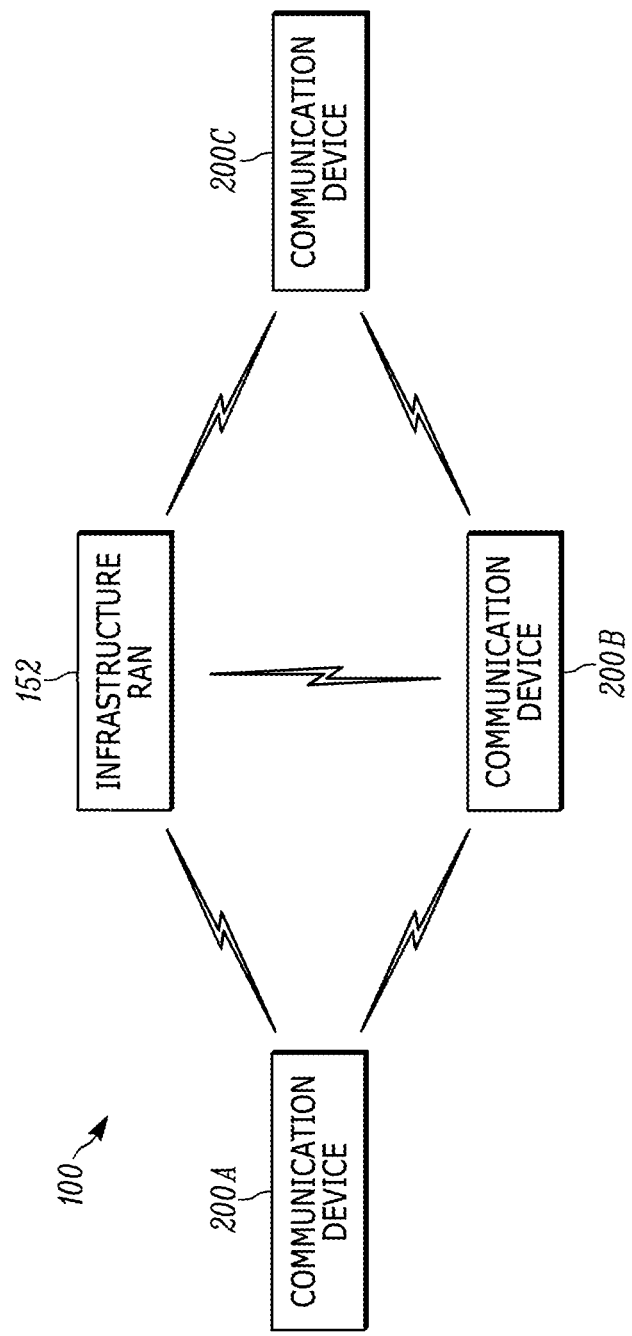

Referring now to the drawings, and in particular FIG. 1A, a communication system diagram illustrates a system 100 of devices including a first set of devices that a user 102 (illustrated in FIG. 1A as a first responder police officer) may wear, such as a primary battery-powered portable radio 104 used for narrowband and/or broadband direct-mode or infrastructure communications, a battery-powered radio speaker microphone (RSM) video capture device 106, a laptop 114 having an integrated video camera and used for data applications such as incident support applications, smart glasses 116 (for example, which may be virtual reality, augmented reality, or mixed reality glasses), sensor-enabled holster 118, and/or biometric sensor wristband 120. Although FIG. 1A illustrates only a single user 102 with a respective first set of devices, in other embodiments, the single user 102 may include additional sets of same or similar devices, and additional users may be present with respective additional sets of same or similar devices as indicated by FIG. 1B.

System 100 may also include a vehicle 132 associated with the user 102 having an integrated mobile communication device 133, an associated vehicular video camera 134, and a coupled vehicular transceiver 136. Although FIG. 1A illustrates only a single vehicle 132 with a single mobile communication device 133, respective single vehicular video camera 134 and/or microphone, and a single coupled vehicular transceiver 136, in other embodiments, the vehicle 132 may include additional same or similar mobile communication devices, video cameras, microphones, and/or transceivers, and additional vehicles may be present with respective additional sets of mobile communication devices, video cameras, microphones, and/or transceivers.

Each of the portable radio 104, RSM video capture device 106, laptop 114, and vehicular mobile communication device 133 may be capable of directly wirelessly communicating via direct-mode wireless link(s) 142, and/or may be capable of wirelessly communicating via a wireless infrastructure radio access network (RAN) 152 over respective wireless link(s) 140, 144 and via corresponding transceiver circuits. These devices may be referred to as communication devices and are configured to receive inputs associated with the user 102 and/or provide outputs to the user 102 in addition to communicating information to and from other communication devices and the infrastructure RAN 152.

The portable radio 104, in particular, may be any communication device used for infrastructure RAN or direct-mode media (for example, voice, audio, video, etc.) communication via a long-range wireless transmitter and/or transceiver that has a transmitter transmit range on the order of miles, for example, 0.5-50 miles, or 3-20 miles (for example, in comparison to a short-range transmitter such as a Bluetooth, Zigbee, or NFC transmitter) with other communication devices and/or the infrastructure RAN 152. The long-range transmitter may implement a direct-mode, conventional, or trunked land mobile radio (LMR) standard or protocol such as European Telecommunications Standards Institute (ETSI) Digital Mobile Radio (DMR), a Project 25 (P25) standard defined by the Association of Public Safety Communications Officials International (APCO), Terrestrial Trunked Radio (TETRA), or other LMR radio protocols or standards. In other embodiments, the long range transmitter may implement a Long Term Evolution (LTE), LTE-Advance, or 5G protocol including multimedia broadcast multicast services (MBMS) or single site point-to-multipoint (SC-PTM) over which an open mobile alliance (OMA) push to talk (PTT) over cellular (OMA-PoC), a voice over IP (VoIP), an LTE Direct or LTE Device to Device, or a PTT over IP (PoIP) application may be implemented. In still further embodiments, the long range transmitter may implement a Wi-Fi protocol perhaps in accordance with an IEEE 802.11 standard (for example, 802.11a, 802.11b, 802.11g) or a WiMAX protocol perhaps operating in accordance with an IEEE 802.16 standard.

In the example of FIG. 1A, the portable radio 104 may form the hub of communication connectivity for the user 102, through which other accessory devices, such as a biometric sensor (for example, the biometric sensor wristband 120), an activity tracker, a weapon status sensor (for example, the sensor-enabled holster 118), a heads-up-display (for example, the smart glasses 116), the RSM video capture device 106, and/or the laptop 114 may communicatively couple.

In order to communicate with and exchange video, audio, and other media and communications with the RSM video capture device 106, laptop 114, and/or smart glasses 116, the portable radio 104 may contain one or more physical electronic ports (such as a USB port, an Ethernet port, an audio jack, etc.) for direct electronic coupling with the RSM video capture device 106, laptop 114, and/or smart glasses 116. In some embodiments, the portable radio 104 may contain a short-range transmitter (for example, in comparison to the long-range transmitter such as a LMR or Broadband transmitter) and/or transceiver for wirelessly coupling with the RSM video capture device 106, laptop 114, and/or smart glasses 116. The short-range transmitter may be a Bluetooth, Zigbee, or NFC transmitter having a transmit range on the order of 0.01-100 meters, or 0.1-10 meters. In other embodiments, the RSM video capture device 106, the laptop 114, and/or the smart glasses 116 may contain their own long-range transceivers and may communicate with one another and/or with the infrastructure RAN 152 or vehicular transceiver 136 directly without passing through portable radio 104.

The RSM video capture device 106 provides voice functionality features similar to a traditional RSM, including one or more of acting as a remote microphone that is closer to the user's 102 mouth, providing a remote speaker allowing playback of audio closer to the user's 102 ear, and including a PTT switch or other type of PTT input. The voice and/or audio recorded at the remote microphone may be provided to the portable radio 104 for storage and/or analysis or for further transmission to other mobile communication devices or the infrastructure RAN 152, or may be directly transmitted by the RSM video capture device 106 to other communication devices or to the infrastructure RAN 152. The voice and/or audio played back at the remote speaker may be received from the portable radio 104 or received directly from one or more other communication devices or the infrastructure RAN 152. The RSM video capture device 106 may include a separate physical PTT switch 108 that functions, in cooperation with the portable radio 104 or on its own, to maintain the portable radio 104 and/or RSM video capture device 106 in a monitor only mode, and which switches the device(s) to a transmit-only mode (for half-duplex devices) or transmit and receive mode (for full-duplex devices) upon depression or activation of the PTT switch 108. The portable radio 104 and/or RSM video capture device 106 may form part of a group communications architecture that allows a single communication device to communicate with one or more group members (not shown) associated with a particular group of devices at a same time.

Additional features may be provided at the RSM video capture device 106 as well. For example, a display screen 110 may be provided for displaying images, video, and/or text to the user 102 or to someone else. The display screen 110 may be, for example, a liquid crystal display (LCD) screen or an organic light emitting display (OLED) display screen. In some embodiments, a touch sensitive input interface may be incorporated into the display screen 110 as well, allowing the user 102 to interact with content provided on the display screen 110. A soft PTT input may also be provided, for example, via such a touch interface.

A video camera 112 may also be provided at the RSM video capture device 106, integrating an ability to capture images and/or video and store the captured image data (for further analysis) or transmit the captured image data as an image or video stream to the portable radio 104 and/or to other communication devices or to the infrastructure RAN 152 directly. The video camera 112 and RSM remote microphone may be used, for example, for capturing audio and/or video of a field-of-view associated with the user 102, perhaps including a suspect and the suspect's surroundings, storing the captured image and/or audio data for further analysis or transmitting the captured audio and/or video data as an audio and/or video stream to the portable radio 104 and/or to other communication devices or to the infrastructure RAN 152 directly for further analysis. An RSM remote microphone of the RSM video capture device 106 may be an omni-directional or unidirectional microphone or array of omni-directional or unidirectional microphones that may be capable of identifying a direction from which a captured sound emanated.

In some embodiments, the RSM video capture device 106 may be replaced with a more limited body worn camera that may include the video camera 112 and/or microphone noted above for capturing audio and/or video, but may forego one or more of the features noted above that transform the body worn camera into a more full featured RSM, such as the separate physical PTT switch 108 and the display screen 110, and remote microphone functionality for voice communications in cooperation with portable radio 104.

The laptop 114, in particular, may be any wireless communication device used for infrastructure RAN or direct-mode media communication via a long-range or short-range wireless transmitter with other communication devices and/or the infrastructure RAN 152. The laptop 114 includes a display screen for displaying a user interface to an operating system and one or more applications running on the operating system, such as a broadband PTT communications application, a web browser application, a vehicle history database application, a workflow application, a forms or reporting tool application, an arrest record database application, an outstanding warrant database application, a mapping and/or navigation application, a health information database application, and/or other types of applications that may require user interaction to operate. The laptop 114 display screen may be, for example, an LCD screen or an OLED display screen. In some embodiments, a touch sensitive input interface may be incorporated into the display screen as well, allowing the user 102 to interact with content provided on the display screen. A soft PTT input may also be provided, for example, via such a touch interface.

Front and/or rear-facing video cameras may also be provided at the laptop 114, integrating an ability to capture video and/or audio of the user 102 and the user's 102 surroundings, perhaps including a field-of-view of the user 102 and/or a suspect (or potential suspect) and the suspect's surroundings, and store and/or otherwise process the captured video and/or audio for further analysis or transmit the captured video and/or audio as a video and/or audio stream to the portable radio 104, other communication devices, and/or the infrastructure RAN 152 for further analysis.

The smart glasses 116 may include a digital imaging device, an electronic processor, a short-range and/or long-range transceiver device, and/or a projecting device. The smart glasses 116 may maintain a bi-directional connection with the portable radio 104 and provide an always-on or on-demand video feed pointed in a direction of the user's 102 gaze via the digital imaging device, and/or may provide a personal display via the projection device integrated into the smart glasses 116 for displaying information such as text, images, or video received from the portable radio 104 or directly from the infrastructure RAN 152. In some embodiments, the smart glasses 116 may include its own long-range transceiver and may communicate with other communication devices and/or with the infrastructure RAN 152 or vehicular transceiver 136 directly without passing through portable radio 104. In some embodiments, an additional user interface mechanism such as a touch interface or gesture detection mechanism may be provided at the smart glasses 116 that allows the user 102 to interact with the display elements displayed on the smart glasses 116 or projected into the user's 102 eyes, or to modify operation of the digital imaging device. In other embodiments, a display and input interface at the portable radio 104 may be provided for interacting with smart glasses 116 content and modifying operation of the digital imaging device, among other possibilities.

The smart glasses 116 may provide a virtual reality interface in which a computer-simulated reality electronically replicates an environment with which the user 102 may interact. In some embodiments, the smart glasses 116 may provide an augmented reality interface in which a direct or indirect view of real-world environments in which the user is currently disposed are augmented (that is, supplemented, by additional computer-generated sensory input such as sound, video, images, graphics, GPS data, or other information). In still other embodiments, the smart glasses 116 may provide a mixed reality interface in which electronically generated objects are inserted in a direct or indirect view of real-world environments in a manner such that they may co-exist and interact in real time with the real-world environment and real world objects.

The sensor-enabled holster 118 may be an active (powered) or passive (non-powered) sensor that maintains and/or provides state information regarding a weapon or other item normally disposed within the user's 102 sensor-enabled holster 118. The sensor-enabled holster 118 may detect a change in state (presence to absence) and/or an action (removal) relative to the weapon normally disposed within the sensor-enabled holster 118. The detected change in state and/or action may be reported to the portable radio 104 via its short-range transceiver. In some embodiments, the sensor-enabled holster 118 may also detect whether the first responder's hand is resting on the weapon even if it has not yet been removed from the holster and provide such information to portable radio 104. In some embodiments, a weapon of the user 102 may include a sensor that detects when the weapon is discharged. The detected discharge may be reported to the portable radio 104, for example. Other possibilities exist as well.

The biometric sensor wristband 120 may be an electronic device for tracking an activity of the user 102 or a health status of the user 102, and may include one or more movement sensors (such as an accelerometer, magnetometer, and/or gyroscope) that may periodically or intermittently provide to the portable radio 104 indications of orientation, direction, steps, acceleration, and/or speed, and indications of health such as one or more of a captured heart rate, a captured breathing rate, and a captured body temperature of the user 102, perhaps accompanying other information. In some embodiments, the biometric sensor wristband 120 may include its own long-range transceiver and may communicate with other communication devices and/or with the infrastructure RAN 152 or vehicular transceiver 136 directly without passing through portable radio 104.

An accelerometer is a device that measures acceleration. Single and multi-axis models are available to detect magnitude and direction of the acceleration as a vector quantity, and may be used to sense orientation, acceleration, vibration shock, and falling. A gyroscope is a device for measuring or maintaining orientation, based on the principles of conservation of angular momentum. One type of gyroscope, a microelectromechanical system (MEMS) based gyroscope, uses lithographically constructed versions of one or more of a tuning fork, a vibrating wheel, or resonant solid to measure orientation. Other types of gyroscopes could be used as well. A magnetometer is a device used to measure the strength and/or direction of the magnetic field in the vicinity of the device, and may be used to determine a direction in which a person or device is facing.

The heart rate sensor may use electrical contacts with the skin to monitor an electrocardiography (EKG) signal of its wearer, or may use infrared light and imaging device to optically detect a pulse rate of its wearer, among other possibilities.

A breathing rate sensor may be integrated within the sensor wristband 120 itself, or disposed separately and communicate with the sensor wristband 120 via a short range wireless or wired connection. The breathing rate sensor may include use of differential capacitive circuits or capacitive transducers to measure chest displacement and thus breathing rates. In other embodiments, a breathing sensor may monitor a periodicity of mouth and/or nose-exhaled air (for example, using a humidity sensor, temperature sensor, capnometer or spirometer) to detect a respiration rate. Other possibilities exist as well.

A body temperature sensor may include an electronic digital or analog sensor that measures a skin temperature using, for example, a negative temperature coefficient (NTC) thermistor or a resistive temperature detector (RTD), may include an infrared thermal scanner module, and/or may include an ingestible temperature sensor that transmits an internally measured body temperature via a short range wireless connection, among other possibilities.

Although the biometric sensor wristband 120 is shown in FIG. 1A as a bracelet worn around the wrist, in other examples, the biometric sensor wristband 120 may additionally and/or alternatively be worn around another part of the body, or may take a different physical form including an earring, a finger ring, a necklace, a glove, a belt, or some other type of wearable, ingestible, or insertable form factor. In some embodiments, the biometric sensor wristband 120 or another device of the user 102 may detect characteristics of the environment of the user 102 (for example, temperature, humidity, air quality, and the like).

The portable radio 104, RSM video capture device 106, laptop 114, smart glasses 116, sensor-enabled holster 118, and/or biometric sensor wristband 120 may form a personal area network (PAN) via corresponding short-range PAN transceivers, which may be based on a Bluetooth, Zigbee, Bluetooth Low Energy, WiFi, Near Field Communication (NFC), Radio Frequency ID (RFID) or other short-range wireless protocol having a transmission range on the order of meters, tens of meters, or hundreds of meters.

The portable radio 104 and/or RSM video capture device 106 (or any other device in FIG. 1A, for that matter) may each include a location determination device integrated with or separately disposed in the portable radio 104 and/or RSM 106 and/or in respective receivers, transmitters, or transceivers of the portable radio 104 and RSM 106 for determining a location of the portable radio 104 and RSM 106. The location determination device may be, for example, a global positioning system (GPS) receiver or wireless triangulation logic using a wireless receiver or transceiver and a plurality of wireless signals received at the wireless receiver or transceiver from different locations, among other possibilities. The location determination device may also include an orientation sensor for determining an orientation that the device is facing. Each orientation sensor may include a gyroscope and/or a magnetometer. Other types of orientation sensors could be used as well. The location may then be stored locally or transmitted via the transmitter or transceiver to other communication devices and/or to the infrastructure RAN 152.

The vehicle 132 associated with the user 102 may include the mobile communication device 133, the vehicular video camera 134 and/or microphone, and the vehicular transceiver 136, all of which may be coupled to one another via a wired and/or wireless vehicle area network (VAN), perhaps along with other sensors physically or communicatively coupled to the vehicle 132. The vehicular transceiver 136 may include a long-range transceiver for directly wirelessly communicating with communication devices such as the portable radio 104, the RSM 106, and the laptop 114 via wireless link(s) 142 and/or for wirelessly communicating with the RAN 152 via wireless link(s) 144. The vehicular transceiver 136 may further include a short-range wireless transceiver or wired transceiver for communicatively coupling between the mobile communication device 133 and/or the vehicular video camera 134 in the VAN. The mobile communication device 133 may, in some embodiments, include the vehicular transceiver 136 and/or the vehicular video camera 134 integrated therewith, and may operate to store and/or process video and/or audio produced by the video camera 134 and/or transmit the captured video and/or audio as a video and/or audio stream to the portable radio 104, other communication devices, and/or the infrastructure RAN 152 for further analysis. A microphone (not shown), or an array thereof, may be integrated in the video camera 134 and/or at the mobile communication device 133 (or additionally or alternatively made available at a separate location of the vehicle 132) and communicatively coupled to the mobile communication device 133 and/or vehicular transceiver 136 for capturing audio and storing, processing, and/or transmitting the audio in a same or similar manner to the video as set forth above. The omni-directional or uni-directional microphone, or an array thereof, may be integrated in the video camera 134 and/or at the mobile communication device 133 (or additionally or alternatively made available at a separate location of the vehicle 132) and communicably coupled to the mobile communication device 133 and/or vehicular transceiver 136 for capturing audio and storing, processing, and/or transmitting the audio in a same or similar manner as set forth above with respect to the RSM 106.

The vehicle 132 may be a human-operable vehicle, or may be a self-driving vehicle operable under control of the mobile communication device 133 perhaps in cooperation with video camera 134 (which may include a visible-light camera, an infrared camera, a time-of-flight depth camera, and/or a light detection and ranging (LiDAR) device). Command information and/or status information such as location and speed may be exchanged with the self-driving vehicle via the VAN and/or the PAN (when the PAN is in range of the VAN or via the VAN's infrastructure RAN link). In some embodiments, devices within the vehicle 132 may communicate with devices in other vehicles via a Vehicular to Vehicular (V2V) Network.

The vehicle 132 and/or transceiver 136, similar to the portable radio 104 and/or respective receivers, transmitters, or transceivers thereof, may include a location (and/or orientation) determination device integrated with or separately disposed in the mobile communication device 133 and/or transceiver 136 for determining (and storing and/or transmitting) a location (and/or orientation) of the vehicle 132.

In some embodiments, instead of a vehicle 132, a land, air, or water-based drone with the same or similar audio and/or video and communications capabilities and the same or similar self-navigating capabilities as set forth above may be disposed, and may similarly communicate with the user's 102 PAN and/or with the infrastructure RAN 152 to support the user 102 in the field.

The VAN may communicatively couple with the PAN disclosed above when the VAN and the PAN come within wireless transmission range of one another, perhaps after an authentication takes place there between. In some embodiments, one of the VAN and the PAN may provide infrastructure communications to the other, depending on the situation and the types of devices in the VAN and/or PAN and may provide interoperability and communication links between devices (such as video cameras) and sensors within the VAN and PAN.

Although the RSM 106, the laptop 114, and the vehicle 132 are illustrated in FIG. 1A as providing example video cameras and/or microphones for use in capturing audio and/or video streams, other types of cameras and/or microphones could be used as well, including but not limited to, fixed or pivotable video cameras secured to lamp posts, automated teller machine (ATM) video cameras, other types of body worn cameras such as head-mounted cameras, other types of vehicular cameras such as roof-mounted cameras, or other types of audio and/or video recording devices accessible via a wired or wireless network interface same or similar to that disclosed herein.

In some embodiments, one or more of the user 102, the vehicle 132, the portable radio 104, the RSM video capture device 106, and any other device in FIG. 1A may be equipped with an environmental sensor such as a chemical, biological, radiological, nuclear, or explosive (CBRNE) sensor. Measurements made by the CBRNE sensor may be stored locally or transmitted via a transmitter or transceiver to other communication devices and/or to the infrastructure RAN 152.

Infrastructure RAN 152 is a radio access network that provides for radio communication links to be arranged within the network between a plurality of user terminals. Such user terminals may be portable, mobile, or stationary and may include any one or more of the communication devices illustrated in FIG. 1A, among other possibilities. At least one other terminal, for example used in conjunction with the communication devices, may be a fixed terminal, for example a base station, eNodeB, repeater, and/or access point. Such a RAN typically includes a system infrastructure that generally includes a network of various fixed terminals, which are in direct radio communication with the communication devices. Each of the fixed terminals operating in the RAN 152 may have one or more transceivers which may, for example, serve communication devices in a given region or area, known as a 'cell' or 'site', by radio frequency (RF) communication. The communication devices that are in direct communication with a particular fixed terminal are said to be served by the fixed terminal. In one example, all radio communications to and from each communication device within the RAN 152 are made via respective serving fixed terminals. Sites of neighboring fixed terminals may be offset from one another and may provide corresponding non-overlapping or partially or fully overlapping RF coverage areas.

Infrastructure RAN 152 may operate according to an industry standard wireless access technology such as, for example, an LTE, LTE-Advance, or 5G technology over which an OMA-PoC, a VoIP, an LTE Direct or LTE Device to Device, or a PoIP application may be implemented. Additionally or alternatively, infrastructure RAN 152 may implement a WLAN technology such as Wi-Fi perhaps operating in accordance with an IEEE 802.11 standard (for example, 802.11a, 802.11b, 802.11g) or such as a WiMAX perhaps operating in accordance with an IEEE 802.16 standard.

Infrastructure RAN 152 may additionally or alternatively operate according to an industry standard LMR wireless access technology such as, for example, the P25 standard defined by the APCO, the TETRA standard defined by the ETSI, the dPMR standard also defined by the ETSI, or the DMR standard also defined by the ETSI. Because these systems generally provide lower throughput than the broadband systems, they are sometimes designated narrowband RANs.

Communications in accordance with any one or more of these protocols or standards, or other protocols or standards, may take place over physical channels in accordance with one or more of a TDMA (time division multiple access), FDMA (frequency divisional multiple access), OFDMA (orthogonal frequency division multiplexing access), or CDMA (code division multiple access) technique.

OMA-PoC, in particular and as one example of an infrastructure broadband wireless application, enables familiar PTT and "instant on" features of traditional half duplex communication devices, but uses communication devices operating over modern broadband telecommunications networks. Using PoC, wireless communication devices such as mobile telephones and notebook computers can function as PTT half-duplex communication devices for transmitting and receiving. Other types of PTT models and multimedia call models (MMCMs) are also available.

Floor control in an OMA-PoC session is generally maintained by a PTT server that controls communications between two or more wireless communication devices. When a user of one of the communication devices keys a PTT button, a request for permission to speak in the OMA-PoC session is transmitted from the user's communication device to the PTT server using, for example, a real-time transport protocol (RTP) message. If no other users are currently speaking in the PoC session, an acceptance message is transmitted back to the user's communication device and the user may then speak into a microphone of the communication device. Using standard compression/decompression (codec) techniques, the user's voice is digitized and transmitted using discrete auditory data packets (for example, together which form an auditory data stream over time), such as according to RTP and internet protocols (IP), to the PTT server. The PTT server then transmits the auditory data packets to other users of the PoC session (for example, to other communication devices in the group of communication devices or talkgroup to which the user is subscribed), using for example, one or more of a unicast, point to multipoint, or broadcast communication technique.

Infrastructure narrowband LMR wireless systems, on the other hand, operate in either a conventional or trunked configuration. In either configuration, a plurality of communication devices is partitioned into separate groups of communication devices. In a conventional narrowband system, each communication device in a group is selected to a particular radio channel (frequency or frequency & time slot) for communications associated with that communication device's group. Thus, each group is served by one channel, and multiple groups may share the same single frequency (in which case, in some embodiments, group IDs may be present in the group data to distinguish between groups using the same shared frequency).

In contrast, a trunked radio system and its communication devices use a pool of traffic channels for virtually an unlimited number of groups of communication devices (for example, talkgroups). Thus, all groups are served by all channels. The trunked radio system works to take advantage of the probability that not all groups need a traffic channel for communication at the same time. When a member of a group requests a call on a control or rest channel on which all of the communication devices at a site idle awaiting new call notifications, in one embodiment, a call controller assigns a separate traffic channel for the requested group call, and all group members move from the assigned control or rest channel to the assigned traffic channel for the group call. In another embodiment, when a member of a group requests a call on a control or rest channel, the call controller may convert the control or rest channel on which the communication devices were idling to a traffic channel for the call, and instruct all communication devices that are not participating in the new call to move to a newly assigned control or rest channel selected from the pool of available channels. With a given number of channels, a much greater number of groups may be accommodated in a trunked radio system as compared with a conventional radio system.

Group calls may be made between wireless and/or wireline participants in accordance with either a narrowband or a broadband protocol or standard. Group members for group calls may be statically or dynamically defined. That is, in a first example, a user or administrator working on behalf of the user may indicate to the switching and/or radio network (perhaps at a call controller, PTT server, zone controller, or mobile management entity (MME), base station controller (BSC), mobile switching center (MSC), site controller, Push-to-Talk controller, or other network device) a list of participants of a group at the time of the call or in advance of the call. The group members (for example, communication devices) could be provisioned in the network by the user or an agent, and then provided some form of group identity or identifier, for example. Then, at a future time, an originating user in a group may cause some signaling to be transmitted indicating that he or she wishes to establish a communication session (for example, group call) with each of the pre-designated participants in the defined group. In another example, communication devices may dynamically affiliate with a group (and also disassociate with the group) perhaps based on user input, and the switching and/or radio network may track group membership and route new group calls according to the current group membership.

In some instances, broadband and narrowband systems may be interfaced via a middleware system that translates between a narrowband PTT standard protocol (such as P25) and a broadband PTT standard protocol or application (such as OMA-PoC). Such intermediate middleware may include a middleware server for performing the translations and may be disposed in the cloud, disposed in a dedicated on-premises location for a client wishing to use both technologies, or disposed at a public carrier supporting one or both technologies. For example, and with respect to FIG. 1A, such a middleware server may be disposed in infrastructure RAN 152 at infrastructure controller 156 or at a separate cloud computing cluster 162 communicably coupled to infrastructure controller 156 via internet protocol (IP) network 160, among other possibilities.

The infrastructure RAN 152 is illustrated in FIG. 1A as providing coverage for the portable radio 104, RSM video capture device 106, laptop 114, smart glasses 116, and/or vehicle transceiver 136 via a single fixed terminal 154 coupled to a single infrastructure controller 156 (for example, a radio controller, call controller, PTT server, zone controller, MME, BSC, MSC, site controller, Push-to-Talk controller, or other network device) and including a dispatch console 158 operated by a dispatcher. In other embodiments, additional fixed terminals and additional controllers may be disposed to support a larger geographic footprint and/or a larger number of mobile devices.

The infrastructure controller 156 illustrated in FIG. 1A, or some other back-end infrastructure device or combination of back-end infrastructure devices existing on-premises or in the remote cloud computing cluster 162 accessible via the IP network 160 (such as the Internet), may additionally or alternatively operate as a back-end electronic digital assistant, a back-end audio and/or video processing device, and/or a remote cloud-based storage device consistent with the remainder of this disclosure.

The IP network 160 may comprise one or more routers, switches, LANs, WLANs, WANs, access points, or other network infrastructure, including but not limited to, the public Internet. The cloud computing cluster 162 may be comprised of a plurality of computing devices, such as the one set forth in FIG. 2, one or more of which may be executing none, all, or a portion of an electronic digital assistant service, sequentially or in parallel, across the one or more computing devices. The one or more computing devices comprising the cloud computing cluster 162 may be geographically co-located or may be separated by inches, meters, or miles, and inter-connected via electronic and/or optical interconnects. Although not shown in FIG. 1A, one or more proxy servers or load balancing servers may control which one or more computing devices perform any part or all of the electronic digital assistant service.

As shown in FIG. 1A, database(s) 164 may be accessible via the IP network 160 and/or the cloud computing cluster 162, and may include databases such as a long-term video storage database, a historical or forecasted weather database, an offender database perhaps including facial recognition images to match against, a cartographic database of streets and elevations, a traffic database of historical or current traffic conditions, or other types of databases. Databases 164 may further include all or a portion of the databases described herein as being provided at the infrastructure controller 156. In some embodiments, the databases 164 may be maintained by third parties (for example, the National Weather Service or a Department of Transportation, respectively). As shown in FIG. 1A, the databases 164 are communicatively coupled with the infrastructure RAN 152 to allow the communication devices (for example, the portable radio 104, the RSM video capture device 106, the laptop 114, and the mobile communication device 133) to communicate with and retrieve data from the databases 164 via infrastructure controller 156 and IP network 160. In some embodiments, the databases 164 are commercial cloud-based storage devices. In some embodiments, the databases 164 are housed on suitable on-premises database servers. The databases 164 of FIG. 1A are merely examples. In some embodiments, the system 100 additionally or alternatively includes other databases that store different information. In some embodiments, the databases 164 and/or additional or other databases are integrated with, or internal to, the infrastructure controller 156.

Finally, although FIG. 1A describes a communication system 100 generally as a public safety communication system that includes a user 102 generally described as a police officer and a vehicle 132 generally described as a police cruiser, in other embodiments, the communication system 100 may additionally or alternatively be a retail communication system including a user 102 that may be an employee of a retailer and a vehicle 132 that may be a vehicle for use by the user 102 in furtherance of the employee's retail duties (for example, a shuttle or self-balancing scooter). In other embodiments, the communication system 100 may additionally or alternatively be a warehouse communication system including a user 102 that may be an employee of a warehouse and a vehicle 132 that may be a vehicle for use by the user 102 in furtherance of the employee's retail duties (for example, a forklift). In still further embodiments, the communication system 100 may additionally or alternatively be a private security communication system including a user 102 that may be an employee of a private security company and a vehicle 132 that may be a vehicle for use by the user 102 in furtherance of the private security employee's duties (for example, a private security vehicle or motorcycle). In even further embodiments, the communication system 100 may additionally or alternatively be a medical communication system including a user 102 that may be a doctor or nurse of a hospital and a vehicle 132 that may be a vehicle for use by the user 102 in furtherance of the doctor or nurse's duties (for example, a medical gurney or ambulance). In still another example embodiment, the communication system 100 may additionally or alternatively be a heavy machinery communication system including a user 102 that may be a miner, driller, or extractor at a mine, oil field, or precious metal or gem field and a vehicle 132 that may be a vehicle for use by the user 102 in furtherance of the miner, driller, or extractor's duties (for example, an excavator, bulldozer, crane, front loader). Other possibilities exist as well.

As mentioned previously, many of the devices shown in FIG. 1A (such as the portable radio 104, the RSM video capture device 106, the laptop 114, the mobile communication device 133, the infrastructure controller 156, the dispatch console 158, and one or more computing devices in the cloud computing cluster 162) may be referred to as communication devices (for example, a communication device 200 as explained below with respect to FIG. 2). Although FIG. 1A shows multiple communication devices 200 associated with the user 102, in some embodiments, the communication system 100 includes communication devices 200 of multiple users. For example, as shown in FIG. 1B, the communication device 200A is associated with a first user, the communication device 200B is associated with a second user, and the communication device 200C is associated with a third user. As indicated by FIG. 1B, in some embodiments, the communication devices 200A, 200B, and 200C communicate with each other over the infrastructure RAN 152 and/or communicate with each other directly as described previously herein. Similarly, other devices, such as the dispatch console 158, may communicate with communication devices 200 of multiple users through the infrastructure RAN 152. In some embodiments, one or more users may have multiple associated communication devices 200, for example, as shown in FIG. 1A.

b. Device Structure

Figure 2:
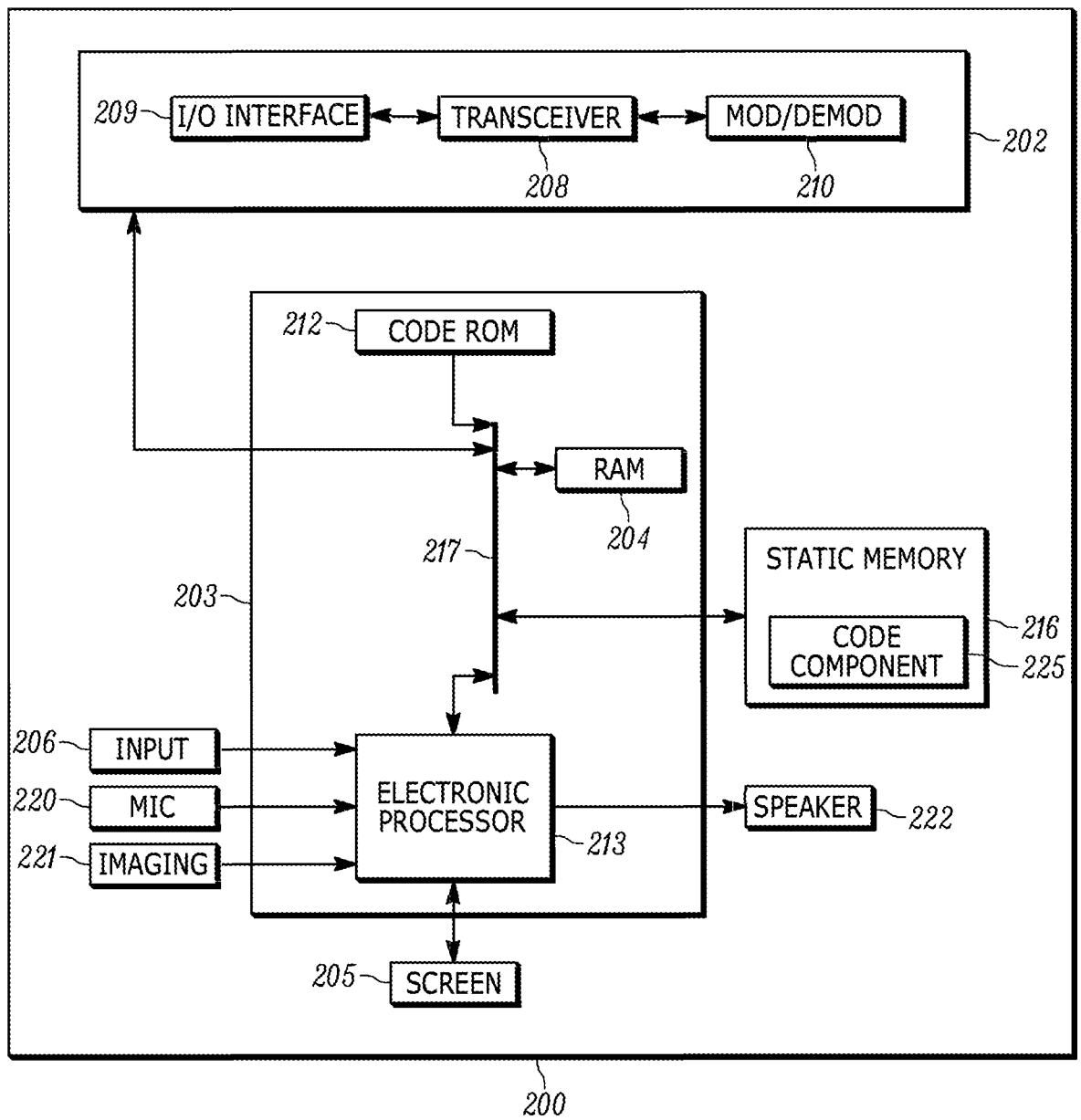
FIG. 2 is a device diagram showing a device structure of a communication device of the system of FIGS. 1A and 1B in accordance with some embodiments.

FIG. 2 sets forth a schematic diagram that illustrates a communication device 200 according to some embodiments of the present disclosure. The communication device 200 may be, for example, embodied in the portable radio 104, the RSM video capture device 106, the laptop 114, the mobile communication device 133, the infrastructure controller 156, the dispatch console 158, one or more computing devices in the cloud computing cluster 162, or some other communication device not illustrated in FIG. 1A, and/or may be a distributed communication device across two or more of the foregoing (or multiple of a same type of one of the foregoing) and linked via a wired and/or wireless communication link(s). In some embodiments, the communication device 200 (for example, the portable radio 104) may be communicatively coupled to other devices such as the sensor-enabled holster 118 as described above. In such embodiments, the combination of the portable radio 104 and the sensor-enabled holster 118 may be considered a single communication device 200.

While FIG. 2 represents the communication devices described above with respect to FIGS. 1A and 1B, depending on the type of the communication device, the communication device 200 may include fewer or additional components in configurations different from that illustrated in FIG. 2. For example, in some embodiments, the communication device 200 acting as the infrastructure controller 156 may not include one or more of the screen 205, microphone 220, imaging device 221, and speaker 222. As another example, in some embodiments, the communication device 200 acting as the portable radio 104 of the RSM video capture device 106 may further include a location determination device (for example, a global positioning system (GPS) receiver) as explained above. Other combinations are possible as well.

As shown in FIG. 2, the communication device 200 includes a communications unit 202 coupled to a common data and address bus 217 of a processing unit 203. The communication device 200 may also include one or more input devices (for example, keypad, pointing device, touch-sensitive surface, button, a microphone 220, an imaging device 221, and/or another input device 206) and an electronic display screen 205 (which, in some embodiments, may be a touch screen and thus also acts as an input device), each coupled to be in communication with the processing unit 203.

The microphone 220 may be present for capturing audio from a user and/or other environmental or background audio that is further processed by processing unit 203 in accordance with the remainder of this disclosure and/or is transmitted as voice or audio stream data, or as acoustical environment indications, by communications unit 202 to other portable radios and/or other communication devices. The imaging device 221 may provide video (still or moving images) of an area in a field of view of the communication device 200 for further processing by the processing unit 203 and/or for further transmission by the communications unit 202. A speaker 222 may be present for reproducing audio that is decoded from voice or audio streams of calls received via the communications unit 202 from other portable radios, from digital audio stored at the communication device 200, from other ad-hoc or direct mode devices, and/or from an infrastructure RAN device, or may playback alert tones or other types of pre-recorded audio.

The processing unit 203 may include a code Read Only Memory (ROM) 212 coupled to the common data and address bus 217 for storing data for initializing system components. The processing unit 203 may further include an electronic processor 213 (for example, a microprocessor or another electronic device) coupled, by the common data and address bus 217, to a Random Access Memory (RAM) 204 and a static memory 216.

The communications unit 202 may include one or more wired and/or wireless input/output (I/O) interfaces 209 that are configurable to communicate with other communication devices, such as a the portable radio 104, the laptop 114, the wireless RAN 152, and/or the mobile communication device 133.

For example, the communications unit 202 may include one or more wireless transceivers 208, such as a DMR transceiver, a P25 transceiver, a Bluetooth transceiver, a Wi-Fi transceiver perhaps operating in accordance with an IEEE 802.11 standard (for example, 802.11a, 802.11b, 802.11g), an LTE transceiver, a WiMAX transceiver perhaps operating in accordance with an IEEE 802.16 standard, and/or another similar type of wireless transceiver configurable to communicate via a wireless radio network.

The communications unit 202 may additionally or alternatively include one or more wireline transceivers 208, such as an Ethernet transceiver, a USB transceiver, or similar transceiver configurable to communicate via a twisted pair wire, a coaxial cable, a fiber-optic link, or a similar physical connection to a wireline network. The transceiver 208 is also coupled to a combined modulator/demodulator 210.

The electronic processor 213 has ports for coupling to the display screen 205, the microphone 220, the imaging device 221, the other input device 206, and/or the speaker 222. Static memory 216 may store operating code 225 for the electronic processor 213 that, when executed, performs one or more of the steps set forth in FIG. 4 and the accompanying text. In some embodiments, the static memory 216 may also store, permanently or temporarily, code corresponding to a timeline application installed on the communication device 200 and timeline information associated with the user 102 for use with the timeline application as explained in greater detail below with respect to FIG. 3.

The static memory 216 may comprise, for example, a hard-disk drive (HDD), an optical disk drive such as a compact disk (CD) drive or digital versatile disk (DVD) drive, a solid state drive (SSD), a tape drive, a flash memory drive, or a tape drive, and the like.

2. Processes for Updating Information in a Timeline of a Public Safety Incident Based on a User Query Related to the Public Safety Incident In some embodiments, an individual component and/or a combination of individual components of the system 100 may be referred to as an electronic computing device that implements an electronic digital assistant as mentioned above. For example, the electronic computing device may be a single electronic processor (for example, the electronic processor 213 of the portable radio 104). In other embodiments, the electronic computing device includes multiple electronic processors distributed remotely from each other. For example, the electronic computing device may be implemented on a combination of at least two of the electronic processor 213 of the portable radio 104, the electronic processor 213 of the infrastructure controller 156, and the electronic processor 213 of a back-end device in the cloud computing cluster 162 accessible via the IP network 160.

To use the electronic digital assistant implemented by the electronic computing device, the user 102 may, for example, provide an oral query that is received by the microphone 220 of the communication device 200. The electronic computing device receives signals representative of the oral query from the microphone 220 and analyzes the signals to determine the content of the oral query. For example, the electronic computing device may include a natural language processing (NLP) engine configured to determine the intent and/or content of the oral query. The electronic computing device may also be configured to determine a response to the oral query (for example, by retrieving stored data or by requesting data from a database such as one of the databases 164) and provide the response to an output device of the communication device 200 (for example, one or more of the speaker 222 via a generated audio response and the screen 205 via a generated text-based response). In other words, one or more of the communication device 200, embodied in one or more of the communication devices of FIG. 1A, such as the portable radio 104, the infrastructure controller 156, and/or cloud computing cluster 162 may include a natural language processing engine to analyze oral queries received by the microphone 220 of the communication device 200 and provide responses to the oral queries.

Although an oral query is described above, in some embodiments, the electronic computing device receives and responds to other types of queries and inputs. For example, the user 102 may submit a text query to the electronic computing device by typing the text query into a hard keyboard input device or a soft keyboard input provided on the screen 205 of the communication device 200. As another example, the user 102 may use the imaging device 221 to capture an image or video of an area and press a hard or soft key to send the image or video to the electronic computing device to, for example, allow the electronic computing device to identify an object in the image or video.

FIG. 3 illustrates an example communication device 200 with an example timeline 305 displayed on the screen 310. In some embodiments, the first electronic processor 213 generates the timeline 305 on the screen 310 by executing code corresponding to a timeline application installed on the communication device 200 (for example, upon receiving user input to open the timeline application). While the communication device 200 of FIG. 3 is a smart telephone, the timeline 305 may be displayed on similar screens or output devices (for example, the screen 205 of other communication devices 200 such as the portable radio 104, the mobile communication device 133, and the dispatch console 158).

The information displayed in the timeline 305 (in other words, timeline information) may be stored by the first electronic processor 213 on a memory of the communication device 200. In some embodiments, the memory of the communication device 200 stores timeline information associated with the user 102 of the communication device 200 (in other words, a timeline of actions taken by the user and events experienced by the user 102). For example, the timeline 305 is a timeline of the user 102. In some embodiments, the memory of the communication device 200 stores timeline information associated with one or more groups of users and one or more public safety incidents. For example, timeline information may relate to a timeline of events of members of a talkgroup, a timeline of events of users at a location (for example, within a geo-fence), a timeline of events of a group of users with similar status (for example, police officers currently driving a police vehicle), or a timeline of events of users with similar roles (for example, police officers patrolling on a bicycle or with a police dog). As another example, the memory of the dispatch console 158 may store a timeline of the events that occurred at one or more public safety incidents. In some embodiments, a public safety incident is an incident in which public safety officers (for example, firefighters, police officers, paramedics, and the like) engage in to protect the public and keep the public safe (for example, a building fire, a criminal pursuit or other law enforcement event, a natural disaster, a medical incident, a traffic accident, and the like). As an example of a timeline of a public safety incident, the timeline application may display a timeline of the traffic accident at the corner of First Street and Main Street. In some embodiments, such a timeline may include at least some information associated with a plurality of public safety officers that were involved with handling the traffic accident. For example, the timeline of the traffic accident may include the events at 2:00, 2:30, and 2:35 of the timeline 305 because those events relate to the traffic accident. In some embodiments, the timeline of the traffic accident may not include the events at 2:15 and 2:20 of the timeline 305 when those events do not relate to the traffic accident (for example, when the call is a personal call). In some embodiments, the timeline of the traffic accident may include all the events of the timeline 305 between 2:00 and 2:35 because the user 102 was handling the specific public safety incident (in other words, the traffic accident) within that time period.

In some embodiments, the dispatch console 158 may store timeline information associated with a plurality of public safety officers and a plurality of public safety incidents. In some embodiments, the memory of the communication device 200 stores multiple timelines of the user 102 (for example, one timeline for each incident in which the user 102 participated). In some embodiments, the timeline information is additionally or alternatively stored remotely from the communication device 200. For example, the timeline information associated with a public safety officer or a public safety incident may be stored at at least one of a memory of the infrastructure controller 156, the databases 164, and a back-end device existing in the cloud computing cluster 162 accessible via the IP network 160.

In some embodiments, the first electronic processor 213 may store timeline information associated with a public safety officer or a public safety event by monitoring for and gathering information in real-time. For example, when the communication device 200 is used to make a call, the first electronic processor 213 stores information relating to the call such as a time of the call, a duration of the call, and a recipient of the call. For example, the timeline 305 indicates that the user 102 called Officer Joe at 2:15 and ended the call with Officer Joe at 2:20.

In some embodiments, the communication device 200 of the user 102 may receive and store information from other communication devices 200 of the user 102 (for example, the mobile communication device 133 in the vehicle 132 of the user 102). For example, the mobile communication device 133 may determine that the vehicle 132 was parked at the corner of First Street and Main Street at 2:00 as indicated by the timeline 305. In some embodiments, the mobile communication device 133 may make such a determination by monitoring internal sensors of the vehicle 132 that indicate the status of the vehicle 132 and by monitoring the location determination device of the vehicle 132. In some embodiments, the timeline application may also store and provide additional information relating to the events in the timeline 305. For example, the user 102 may manually enter the additional information in real-time or after the user 102 has left the location of the incident. For example, the user 102 may enter additional information indicating that he or she parked the vehicle 132 at 2:00 to handle a traffic accident.

The format of the timeline 305 shown in FIG. 3 is merely an example. Other formats are possible. In some embodiments, descriptions of events (as shown in FIG. 3) and content of messages (not shown) may both be viewable on the timeline 305. In some embodiments, when additional information is stored about an event, an icon near the event description or near the time of the event is displayed to indicate that additional information is available. In such embodiments, the user 102 may select the icon to display the additional information on the screen 310. In some embodiments, different types of icons may indicate different types of available additional information. For example, a cloud icon may indicate that the additional information relates to the weather. In some embodiments, the column of additional information may not be present in the timeline 305. For example, in some embodiments, additional information may only be displayed by selecting an icon as explained above. In some embodiments, the time displayed on the timeline 305 is more refined (for example, the time may include seconds and tenths of seconds in addition to hours and minutes).

As explained above, the first electronic processor 213 running the timeline application may manually receive timeline information and may monitor and gather timeline information from its own sensors as well as sensors of other communication devices 200. However, manually storing timeline information may be inconvenient and time-consuming for the user 102. Additionally, using the communication device 200 to monitor and gather real-time information to be stored for use with the timeline application may not be possible in some situations and for all types of information. For example, the communication device 200 may not be capable of determining the weather conditions or the traffic conditions at a public safety incident. Even when the communication device 200 is capable of determining such conditions, these conditions may not always be relevant at a given public safety incident. When the timeline application stores such irrelevant information, a public safety officer using the timeline application to view the timeline 305 may be less likely to recognize more relevant information due to the amount of information shown on the timeline 305.

Figure 4:
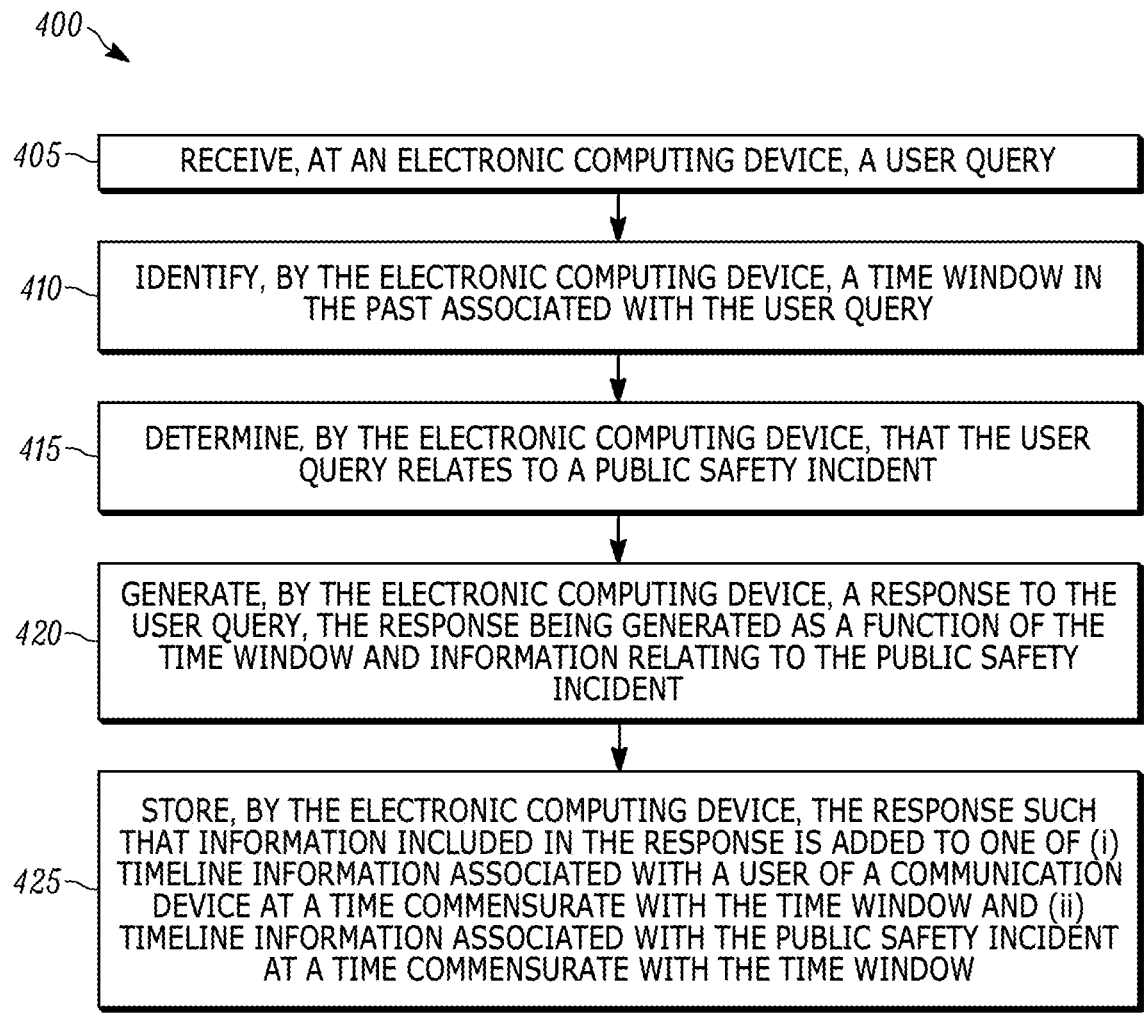
FIG. 4 illustrates a flow chart of a method of updating information in a timeline of a public safety incident in accordance with some embodiments.

To update the timeline information stored for use with the timeline application to include additional relevant information, the electronic computing device that implements the electronic digital assistant may perform a method 400 illustrated in FIG. 4.

FIG. 4 illustrates a flow chart diagram of the method 400 performed by the electronic computing device for updating information in a timeline of a public safety incident based on a user query related to the public safety incident. While a particular order of processing steps, message receptions, and/or message transmissions is indicated in FIG. 4 as an example, timing and ordering of such steps, receptions, and transmissions may vary where appropriate without negating the purpose and advantages of the examples set forth in detail throughout the remainder of this disclosure.

At block 405, the electronic computing device receives a user query from the user 102. The electronic computing device receives the user query via an input device (for example, an oral query received by the microphone 220, a typed query received by the screen 205, or another type of query received by another input device of the communication device 200 as described above).

At block 410, the electronic computing device identifies a time window in the past associated with the user query. In some embodiments, the electronic computing device may determine that the user query relates to a time window in the past by analyzing words included in the user query. For example, past tense words may indicate that the user query relates to a time window in the past. As another example, the electronic computing device may recognize words that correspond to events that the user 102 recently attended or locations where the user 102 was recently located. In such an example, the electronic computing device may identify a time window in the past when the user 102 was attending the specified event or located at the specified location. In some situations, the user query may explicitly identify a time window in the past. For example, the user query may ask about the weather at a specified date and/or time in the past. Based on such a user query, the electronic computing device may identify the time window as the entire day in the past or a more specified time during the day in the past.

At block 415, the electronic computing device determines that the user query relates to a public safety incident. Similar to the explanation of block 410 above, in some embodiments, the electronic computing device may determine that the user query relates to a public safety incident by analyzing words included in the user query. For example, the electronic computing device may recognize at least one of a location name, a criminal name, and a public safety code that corresponds to a location, a criminal, or a public safety code that the user 102 recently used or encountered (for example, by referencing stored information such as the timeline information described above). In such an example, the electronic computing device determines that the user query relates to a public safety incident that involved the recognized location, criminal, or public safety code. In some situations, the user query explicitly identifies a public safety incident in the past. For example, the user query may ask about the weather at a time when a traffic accident occurred on a previous date. Based on such a user query, the electronic computing device may determine that the user query relates to the traffic accident.

At block 420, the electronic computing device generates a response to the user query. The response is generated as a function of the time window and information relating to the public safety incident. In some embodiments, the electronic computing device retrieves stored data related to one or both of the time window and the public safety incident from one or more memories to generate the response (for example, from at least one of a memory on the communication device 200, the infrastructure controller 156, and a back-end device existing in the cloud computing cluster 162). In some embodiments, the electronic computing device requests data from one or more of the databases 164 to generate the response. For example, the user 102 may inquire about the traffic conditions at the time of the traffic accident at the corner of First Street and Main Street yesterday. To generate a response, the electronic computing device may request information from a traffic database 164 relating to the traffic conditions at First Street and Main Street yesterday at the determined time of the accident.

In some embodiments, the information included in the response includes a plurality of types of information (for example, weather information, traffic information, traffic device functionality information, construction information, criminal record information, and the like). Continuing the above example with respect to a user query relating to the traffic conditions at the time of the specified traffic accident, the electronic computing device may also generate other information related to the traffic accident in addition to traffic conditions in response to the user query. For example, the electronic computing device may determine that the user 102 was engaged in a call with Officer Joe near the time when the traffic accident occurred and while the user 102 was at the scene of the traffic accident (see the timeline 305 in FIG. 3). As another example, the electronic computing device may determine the weather conditions at the time and location of the traffic accident. In some embodiments, the electronic computing device may determine the weather conditions at a predetermined time before the traffic accident. Referring to the previous example, the electronic computing device may determine that it was raining from 1:45 to 3:00 at the location of the traffic accident. As other examples, the electronic computing device may determine that construction was ongoing at the location of the traffic accident or that traffic lights at the intersection of the traffic accident were reported as malfunctioning at 1:30. In some embodiments, the response includes the time window identified by the electronic computing device at block 410. In some embodiments, the response includes a time associated with one or more past events associated with the user 102 that the electronic computing device has identified as additional information (in other words, a time at which a past event occurred such as the user 102 parking the vehicle 132 at the location of the traffic accident at 2:00). Such time information allows information to be stored in the proper chronological location among the timeline information during the storing of information as explained below with respect to block 425. In some embodiments, the electronic computing device is configured to determine additional information that may be relevant to the public safety incident associated with the user query.

The information generated by the electronic computing device in response to the user query may include a plurality of types of information that have different relevance levels. In some embodiments, the electronic computing device may categorize the information into relevant information and peripheral information. Continuing the previous example, traffic congestion information indicating the amount of traffic on the road may be relevant information because the user query explicitly inquired about the traffic conditions at the specified traffic accident. In some embodiments, the electronic computing device may categorize other information as relevant information. For example, when the electronic computing device determines that the weather at the location of the traffic accident was severe (for example, heavy rain, a snow storm, and the like) and may have significantly influenced the traffic accident, the electronic computing device may categorize the weather information as relevant information. On the other hand, in some embodiments, the electronic computing device may categorize the weather information as peripheral information (for example, when the weather did not likely significantly influence the traffic accident). Similarly, the electronic computing device may categorize other information as peripheral information when the user query did not explicitly inquire about this other information. For example, the electronic computing device may categorize the information indicating that the user 102 was engaged in a call with Officer Joe while the user 102 was at the scene of the traffic accident as peripheral information.

These relevance levels are mere examples. In some embodiments, the relevance levels may include additional levels (for example, high, medium, and low or a scale from one to ten). In some embodiments, the user 102 may enter settings on the communication device 200 to control the categorization of information into the relevance levels by the electronic computing device. For example, the user 102 may enter settings to include more or less information as relevant information.

After the electronic computing device generates the response to the user query, the electronic computing device provides the response with an output device of the communication device 200 (for example, an audio response using the speaker 222, a visual response using the screen 205, or the like). In some embodiments, the response provided on the output device only includes the type of information with the highest relevance level among the plurality of types of information. Continuing the previous example, the response provided on the output device may only include information related to the traffic conditions at the specified accident (in other words, information categorized as relevant information). For example, the electronic computing device may cause the speaker 222 to output a voice that states, "Traffic was heavily congested. The average vehicle speed was less than five miles per hour." In some embodiments, the response provided on the output device may include additional information generated by the electronic computing device (for example, peripheral information as explained above). In some embodiments, the user 102 may enter settings on the communication device 200 to control the amount of information included in the response provided on the output device.

At block 425, the electronic computing device stores the response such that information included in the response is added to one of (i) timeline information associated with the user 102 of the communication device 200 at a time commensurate with the time window and (ii) timeline information associated with the public safety incident at a time commensurate with the time window. In some embodiments, the electronic computing device stores at least one piece of information from the relevant information and the peripheral information generated in response to the user query in the memory of the communication device 200. For example, this information may be stored as timeline information for use with the timeline application as described above. In other words, in some embodiments, the electronic computing device updates timeline information associated with the user 102. In some embodiments, the response provided by the output device may only include the type of information with the highest relevance (for example, relevant information) while the information stored as timeline information may include at least one of the relevant information and additional information included in the response (for example, peripheral information).

FIG. 5 illustrates the communication device 200 of FIG. 3 with an updated timeline 505 displayed on the screen 310. The updated timeline 505 includes the timeline information associated with the user 102 as explained above. Due to the electronic computing device updating the timeline information at block 425, at least some of the information generated by the electronic computing device in response to the user query is included in the updated timeline 505. As shown in FIG. 5, compared to the timeline 305 of FIG. 3, the updated timeline 505 includes added events and added additional information with respect to events that were already included in the timeline information. For example, the updated timeline 505 includes a new event at 1:30 that indicates that the traffic lights at First Street were reported as malfunctioning. The updated timeline 505 also includes a new event at 1:45 that indicates that it started raining at the corner of First Street and Main Street. New additional information associated with the event at 1:45 indicates that traffic was heavily congested on First Street and the average vehicle speed was five miles per hour. The updated timeline 505 also includes new additional information associated with the event at 2:00 that was previously included in the timeline information as indicated in FIG. 3. The new additional information indicates that there is ongoing construction at the corner of First Street and Main Street.

As illustrated by the difference between the timeline 305 of FIG. 3 and the updated timeline 505 of FIG. 5, the information generated by the electronic computing device in response to a user query may be used to update the timeline information associated with the user 102 to provide a more complete timeline of the actions and events experienced by, or of relevance to, the user 102. Although the timelines 305 and 505 are timelines of the user 102 and the method 400 is described above with respect to timeline information associated with the user 102, in some embodiments, the electronic computing device may additionally or alternatively execute the method 400 to update timeline information associated with a public safety incident or a group of users as mentioned previously.

In some embodiments, before the electronic computing device stores the information included in the response (at block 425), an output device of the communication device 200 provides a prompt to the user 102 to determine whether to add the information included in the response to the timeline information. For example, the prompt may be a verbal prompt provided by the speaker 222 or a visual prompt provided on the screen 205. The prompt allows the user 102 to select whether to update the timeline information with the information included in the response to the user query. In some embodiments, the prompt may allow the user 102 to select which information to be stored with the timeline information among the plurality of types of information included in the response.

In some embodiments, the electronic computing device transmits information included in the response to the user query from the user 102 to a second communication device 200 associated with another user. The second communication device 200 may then store the received information such that information included in the response is added to second timeline information that is used to generate a second timeline (for example, a timeline of a second user or of a public safety incident). In other words, the electronic computing device may update timeline information associated with a second user or of a public safety incident using information included in the response to the user query from the user 102. For example, in addition to updating timeline information associated with the user 102 in response to the user query as explained above, the electronic computing device may also update timeline information associated with Officer Joe stored on Officer Joe's communication device or timeline information associated with the traffic accident stored on the dispatch console 158.

In some embodiments, the electronic computing device may identify one or more second communication devices for which to update second timeline information based on at least one selected from the group consisting of a current communication status of the communication device 200 of the user 102, a previous communication status of the communication device 200 of the user 102 at a time during the time window, a previous location of the communication device of the user 102 at a time during the time window, and a previous incident status of the communication device of the user 102 at a time during the time window.

In some embodiments, the current communication status of the communication device 200 of the user 102 indicates another user or a talkgroup with which the user 102 is currently communicating. For example, when the user 102 is on a call with Officer Joe when the microphone 220 receives the user query, the electronic computing device may identify the communication device 200 of Officer Joe as the second communication device.

In some embodiments, the previous communication status of the communication device 200 of the user 102 indicates another user or talkgroup with which the user 102 was communicating during the time window in the past associated with the user query. Continuing the traffic accident example from above, when the user query relates to the traffic accident, the electronic computing device may identify the communication device of Officer Joe as the second communication device because the user 102 called Officer Joe while handling the traffic accident (see the timeline 305 of FIG. 3).

In some embodiments, the electronic computing device may identify the second communication device based on a previous location of the communication device of the user 102 at a time during the time window. For example, the electronic computing device may identify a communication device of another public safety officer as the second communication device when the other public safety officer was located near the user 102 during the time window in the past associated with the user query.

In some embodiments, the previous incident status of the communication device 200 of the user 102 indicates the incident that the user 102 was handling during the time window in the past associated with the user query (for example, the traffic accident). The electronic computing device may identify a communication device of another user (for example, another public safety officer) that has the same previous incident status of the communication device 200 of the user 102. In other words, the electronic computing device may identify a communication device of another user as the second communication device when the other user handled the same incident as the user 102 (for example, the traffic accident).

In some embodiments, before the information included in the response is added to the second timeline information associated with the second user of the second communication device, an output device of the second communication device may provide a prompt to the second user to determine whether to add the information to the second timeline information. This prompt and its corresponding functionality are similar to that described above with respect to the communication device 200.

Although the second communication device is described above as being associated with a second user, in some embodiments, the second communication device is associated with the first user. In such embodiments, the electronic computing device may transmit information included in the response to the second communication device via a personal area network (PAN) or a vehicle area network (VAN) that includes the second communication device.

As mentioned previously, the communication device 200 may be subscribed (in other words, affiliated) with a group of communication devices (in other words, a talkgroup) such that the communication devices of the talkgroup may communicate with each other. Such communication is possible using a variety of communication systems as explained above (for example, an infrastructure broadband wireless system or a trunked radio system). In some embodiments, the electronic computing device transmits a request to change a current talkgroup affiliation of the communication device 200 to a previous talkgroup affiliation based on the user query. In such embodiments, after the electronic computing device identifies the time window in the past associated with the user query (at block 410), the electronic computing device determines a previous talkgroup affiliation of the communication device 200 based on a previous communication status of the communication device 200 during the time window. As explained above, the previous communication status of the communication device 200 of the user 102 may indicate another talkgroup with which the user 102 was communicating during the time window in the past associated with the user query. The electronic computing device may then provide, with an output device of the communication device 200, a prompt to the user 102 to determine whether to change a current talkgroup affiliation of the communication device 200 to the previous talkgroup affiliation. When the user 102 desires to revert back to the previous talkgroup affiliation, an input device of the communication device 200 receives a second response to the prompt that indicates that the current talkgroup affiliation should be changed to the previous talkgroup affiliation. The electronic computing device then transmits a request to change the current talkgroup affiliation of the communication device 200 to the previous talkgroup affiliation in response to the second response to the prompt. For example, the electronic computing device may send the request to a PTT server or to a controller on a control or rest channel of a trunked radio system.

In some embodiments, the electronic computing device may update second timeline information on the communication devices included in a talkgroup based on the previous talkgroup affiliation of the communication device 200 during the time window. In other words, the electronic computing device may identify the communication devices included in the talkgroup that the communication device 200 was a part of during the time window as second communication devices for which to update second timeline information. In such embodiments, the electronic computing device transmits updated timeline information included in the response to the user query to the communication devices included in the previous talkgroup via the previous talkgroup affiliation or individually transmits the updated timeline information to the communication devices included in the previous talkgroup as individual messages.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for updating information in a timeline of a public safety incident, the method comprising:
   receiving, at an electronic computing device, a user query;
   identifying, by the electronic computing device, a time window in the past associated with the user query;
   determining, by the electronic computing device, that the user query relates to a public safety incident;
   generating, by the electronic computing device, a response to the user query, the response to the user query being generated as a function of the time window and information relating to the public safety incident;
   providing the response to the user query with an output device of a communication device;
   storing, by the electronic computing device, the response to the user query such that information included in the response to the user query is added to one of (i) timeline information associated with a user of the communication device at a time commensurate with the time window and (ii) timeline information associated with the public safety incident at a time commensurate with the time window, wherein the information included in the response to the user query that is added to the one of (i) timeline information associated with a user of the communication device and (ii) timeline information associated with the public safety incident includes additional information that was not included in the one of (i) timeline information associated with a user of the communication device and (ii) timeline information associated with the public safety incident prior to the electronic computing device receiving the user query; and
   generating, with an electronic processor on a screen of the communication device, a timeline including at least one of a group consisting of the timeline information associated with the user and the timeline information associated with the public safety incident.

2. The method of claim 1, wherein generating the response to the user query includes generating the response to the user query, the response to the user query including
   a past event associated with one of the user and the public safety incident, and
   a time at which the event has occurred.

3. The method of claim 1, wherein providing the response to the user query with the output device includes providing at least one selected from the group consisting of an audio response using a speaker and a visual response using the screen.

4. The method of claim 1, wherein the information included in the response to the user query includes a plurality of types of information, and further comprising determining a relevance level of each of the types of information;
   wherein providing the response to the user query with the output device includes providing the response to the user query with the output device, the response to the user query only including the type of information with the highest relevance level among the plurality of types of information;
   wherein storing the response to the user query includes storing the information included in the response to the user query, the information included in the response to the user query including at least two of the types of information among the plurality of types of information, the plurality of types of information including at least two selected from the group consisting of weather information, traffic information, traffic device functionality information, construction information, and criminal record information.

5. The method of claim 1, further comprising:
identifying, by the electronic computing device, a second communication device associated with a second user based on at least one selected from the group consisting of a current communication status of the communication device, a previous communication status of the communication device at a time during the time window, a previous location of the communication device at a time during the time window, and a previous incident status of the communication device at a time during the time window; and
transmitting, with the electronic computing device, the information included in the response to the user query to the second communication device to be stored such that the information included in the response to the user query is added to second timeline information associated with the second user of the second communication device.

6. The method of claim 5, further comprising:
receiving, at the second communication device, the information included in the response to the user query;
providing, with a second output device, a prompt to the second user to determine whether to add the information included in the response to the user query to the second timeline information;
receiving, by an input device, a second response to the prompt, the second response indicating that the information included in the response to the user query should be added to the second timeline information;
storing, with a second electronic computing device, the information included in the response to the user query in response to the second response to the prompt such that the information included in the response to the user query is added to the second timeline information; and
generating, with the second electronic computing device on a second screen of the second communication device, a second timeline including the second timeline information.

7. The method of claim 1, further comprising:
providing, with the output device, a prompt to the user to determine whether to add the information included in the response to the user query to the at least one of the group consisting of the timeline information associated with the user and the timeline information associated with the public safety incident; and
receiving, by an input device, a second response to the prompt, the second response indicating that the information included in the response to the user query should be added to the at least one of the group consisting of the timeline information associated with the user and the timeline information associated with the public safety incident;

wherein storing the response to the user query includes storing the response to the user query in response to the second response in the prompt.

8. The method of claim 1, wherein receiving the user query includes receiving, with a microphone of the electronic computing device, the user query, the user query being an oral query;
wherein identifying the time window in the past associated with the user query includes using natural language processing to determine that one or more words included in the oral query indicate that the oral query relates to the past; and
wherein determining that the user query relates to the public safety incident includes using natural language processing to analyze one or more words included in the oral query.

9. The method of claim 1, further comprising:
determining a previous talkgroup affiliation of the communication device based on a previous communication status of the communication device during the time window;
providing, with the output device, a prompt to the user to determine whether to change a current talkgroup affiliation of the communication device to the previous talkgroup affiliation;
receiving, by an input device, a second response to the prompt, the second response indicating that the current talkgroup affiliation should be changed to the previous talkgroup affiliation; and
transmitting, with the electronic computing device, a request to change the current talkgroup affiliation to the previous talkgroup affiliation in response to the second response to the prompt.

10. The method of claim 1, wherein generating the response to the user query includes requesting the additional information from a database separate from the electronic computing device.

11. An electronic computing device comprising:
one or more electronic processors configured to
receive a user query;
identify a time window in the past associated with the user query;
determine that the user query relates to a public safety incident;
generate a response to the user query, wherein the response to the user query is generated as a function of the time window and information relating to the public safety incident;
provide the response to the user query with an output device of a communication device;
store the response to the user query such that information included in the response to the user query is added to one of (i) timeline information associated with a user of the communication device at a time commensurate with the time window and (ii) timeline information associated with the public safety incident at a time commensurate with the time window, wherein the information included in the response to the user query that is added to the one of (i) timeline information associated with a user of the communication device and (ii) timeline information associated with the public safety incident includes additional information that was not included in the one of (i) timeline information associated with a user of the communication device and (ii) timeline information associated with the public safety incident prior to the electronic computing device receiving the user query; and
generate a timeline including at least one of a group consisting of the timeline information associated with the user and the timeline information associated with the public safety incident.

12. The electronic computing device of claim 11, wherein the response to the user query includes a past event associated with one of the user and the public safety incident, and a time at which the event has occurred.

13. The electronic computing device of claim 11, wherein the output device includes at least one selected from the group consisting of a speaker and the screen.

14. The electronic computing device of claim 11, wherein the information included in the response to the user query includes a plurality of types of information, and the one or more electronic processors is further configured to determine a relevance level of each of the types of information;
wherein the response to the user query only includes the type of information with the highest relevance level among the plurality of types of information;
wherein the information included in the response to the user query includes at least two of the types of information among the plurality of types of information, the plurality of types of information including at least two selected from the group consisting of weather information, traffic information, traffic device functionality information, construction information, and criminal record information.

15. The electronic computing device of claim 11, wherein the one or more electronic processors are further configured to:
identify a second communication device associated with a second user based on at least one selected from the group consisting of a current communication status of the communication device, a previous communication status of the communication device at a time during the time window, a previous location of the communication device at a time during the time window, and a previous incident status of the communication device at a time during the time window; and
transmit the information included in the response to the user query to the second communication device to be stored such that the information included in the response to the user query is added to second timeline information associated with the second user of the second communication device.

16. The electronic computing device of claim 15, further comprising a second electronic computing device configured to:
receive the information included in the response to the user query;
provide, with a second output device, a prompt to the second user to determine whether to add the information included in the response to the user query to the second timeline information;
receive, by an input device, a second response to the prompt, the second response indicating that the information included in the response to the user query should be added to the second timeline information;
store the information included in the response to the user query in response to the second response to the prompt such that the information included in the response to the user query is added to the second timeline information; and generate, on a screen of the second communication device, a second timeline including the second timeline information.

17. The electronic computing device of claim 11, wherein the one or more electronic processors are further configured to:
- provide, with the output device, a prompt to the user to determine whether to add the information included in the response to the user query to the at least one of the group consisting of the timeline information associated with the user and the timeline information associated with the public safety incident; and
- receive, by an input device, a second response to the prompt, the second response indicating that the information included in the response to the user query should be added to the at least one of the group consisting of the timeline information associated with the user and the timeline information associated with the public safety incident;
- wherein the one or more electronic processors store the response to the user query in response to the second response to the prompt.

18. The electronic computing device of claim 11, wherein the user query is an oral query received with a microphone of the electronic computing device;
- wherein the one or more electronic processors are configured to identify the time window in the past associated with the user query by using natural language processing to determine that one or more words included in the oral query indicate that the oral query relates to the past; and
- wherein the one or more electronic processors are configured to determine that the user query relates to the public safety incident by using natural language processing to analyze one or more words included in the oral query.

19. The electronic computing device of claim 11, wherein the one or more electronic processors are further configured to:
- determine a previous talkgroup affiliation of the communication device based on a previous communication status of the communication device during the time window;
- provide, with the output device, a prompt to the user to determine whether to change a current talkgroup affiliation of the communication device to the previous talkgroup affiliation;
- receive, by an input device, a second response to the prompt, the second response indicating that the current talkgroup affiliation should be changed to the previous talkgroup affiliation; and
- transmit a request to change the current talkgroup affiliation to the previous talkgroup affiliation in response to the second response to the prompt.

20. The electronic computing device of claim 11, wherein the one or more electronic processors are further configured to generate the response to the user query by requesting the additional information from a database separate from the electronic computing device.

* * * * *